Dec. 28, 1937.   J. K. O'M. FARRELL   2,103,577
COSMETIC DEVICE
Original Filed July 7, 1936
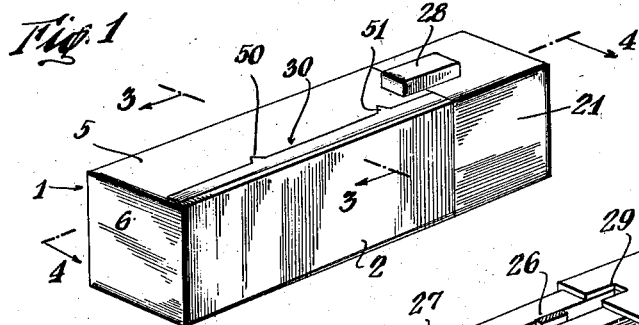
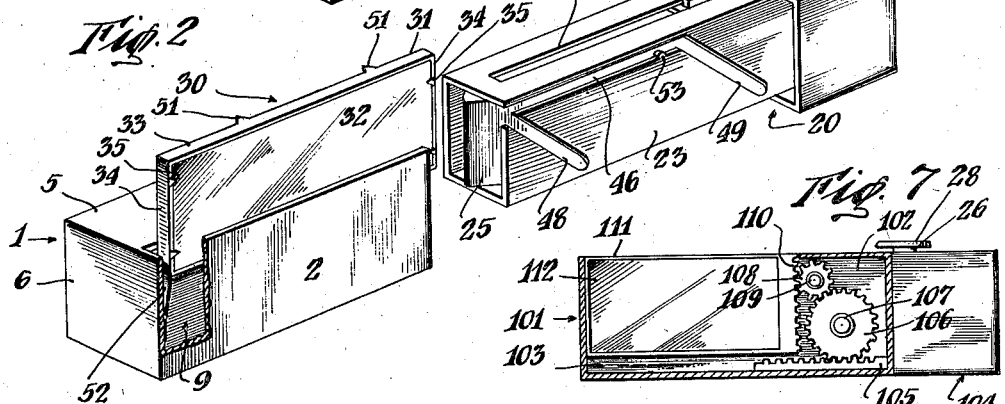
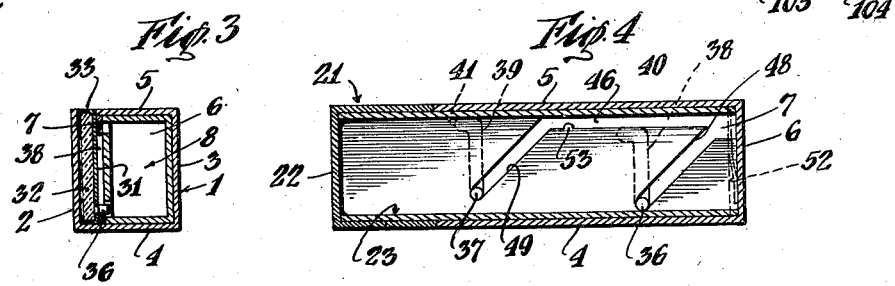
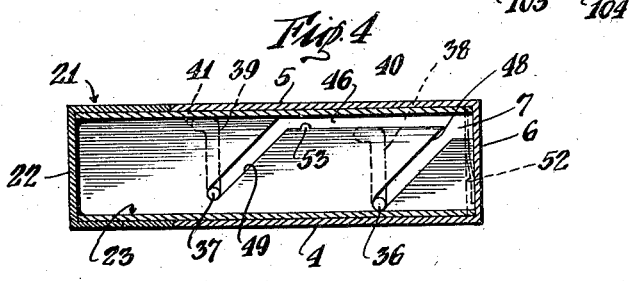
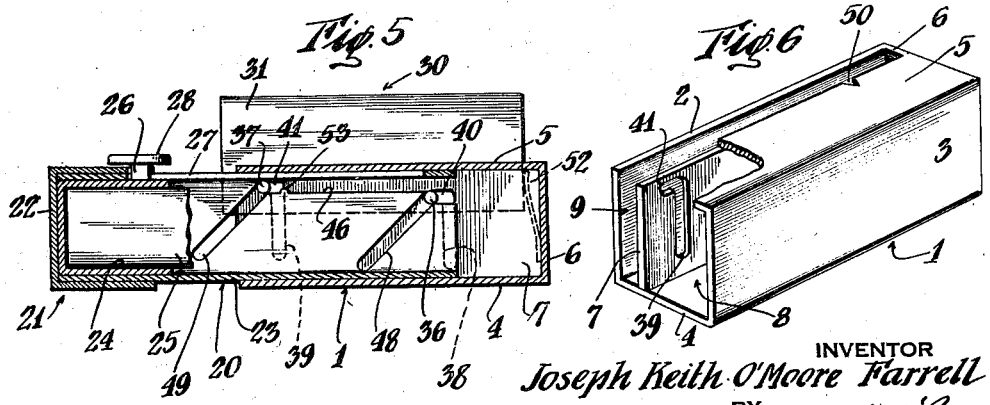
INVENTOR
Joseph Keith O'Moore Farrell
BY
ATTORNEY Patented Dec. 28, 1937

2,103,577

UNITED STATES PATENT OFFICE 2,103,577

COSMETIC DEVICE

Joseph Keith O'Moore Farrell, New York, N. Y.

Application July 7, 1936, Serial No. 89,388
Renewed August 31, 1937

12 Claims. (Cl. 132—79)

This invention relates to cosmetic devices and particularly to a container for a cosmetic pencil, having associated therewith a mirror which is concealed within the container and is moved to exposed position for use when the container is opened and the pencil withdrawn therefrom.

According to the present invention, there is provided a lipstick container including two separable sections, one of which is formed as a casing adapted to receive the lipstick and the other of which is formed as a holder adapted to carry the lipstick and having a cap portion adapted to close the casing to provide therewith a housing for the lipstick. A mirror or mirror-carrying frame is slidably received in the casing and is adapted to be projected out of the casing upon separation of the cap from the casing. A mirror-operating mechanism is provided which is actuated by separation of the cap from the casing to project the mirror from the casing and which returns the mirror to its position within the casing when the cap is returned to closed position.

The mirror is adapted to be completely concealed within and protected by the casing when the container is closed, thereby to prevent damage to the mirror. Suitable means are provided for positively maintaining the mirror in exposed position and preventing accidental retraction of the mirror into the casing. The mirror is positively and automatically projected from the casing when the lipstick is withdrawn from the casing and is positively and automatically returned upon a return movement of the lipstick and no other manual operations are necessary to return the mirror to a concealed position. Resilient means may be provided for cushioning the mirror in concealed position and for resiliently retaining the mirror in exposed position, thereby to prevent rattling or damage to the mirror and to prevent accidental movement from exposed position.

An object of the invention is the provision of a combined container for a cosmetic pencil and mirror wherein the mirror is normally concealed and protected and is exposed for use by opening the container and removing the pencil therefrom.

Another object of the invention is the provision of a device of the class described wherein the mirror is positively and automatically actuated by opening or closing of the container without requiring any additional manual operations.

A further object of the invention is the provision of a device of the class described wherein the mirror is positively concealed within the container and is protected against damage, is positively moved to exposed position, is positively maintained in exposed position and cannot inadvertently be returned to concealed position except by manipulation of the container in the intended manner.

A still further object of the invention is to provide a device of the class described which is simple and economical to construct, is positive and automatic in operation, and is sturdy and not readily damaged by normal use.

Various other features and advantages of the invention will be apparent from the following particular description and from an inspection of the accompanying drawing.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawing forming a part thereof, in which:

Fig. 1 is a perspective view of a lipstick device constructed in accordance with the invention;

Fig. 2 is an exploded perspective view showing the lipstick holder and casing in separated position and the mirror in exposed position;

Fig. 3 is a transverse cross-sectional view taken along line 3—3 of Fig. 1;

Fig. 4 is a longitudinal cross-sectional view taken along line 4—4 of Fig. 1;

Fig. 5 is a rear elevational view showing the holder partially withdrawn from the casing and the mirror in exposed position, certain of the structure being shown in cross-section to expose the interior;

Fig. 6 is a perspective view of the casing, a portion of the structure being broken away to expose the interior; and Fig. 7 is a front elevational view of a modified form of lipstick device, a portion of the structure being shown in cross-section to expose the interior.

In the following description and in the claims, various details will be identified by specific names for convenience, but they are intended to be as generic in their application as the art will permit. Like reference characters denote like parts in the several figures of the drawing.

In the drawing accompanying and forming part of this specification, certain specific disclosure of the invention is made for purposes of explanation, but it will be understood that the details may be modified in various respects without departure from the broad aspect of the invention.

Referring now particularly to the drawing there is shown a casing 1 adapted to telescopingly receive a lipstick, and a cooperating cap 21 adapted to carry a pencil and close the end of the casing 1, as more fully explained hereinafter. The casing 1 and cap 21 may be formed in any suitable manner as, for example, from bent or stamped metal sheet, metal tubing, or they may be die cast. Preferably the material from which they are constructed is rust-proof material, such as brass, or suitably plated or enameled, or otherwise coated. The casing and cap may be made in various convenient shapes and sizes.

The casing 1 preferably is formed with a front wall 2, rear wall 3, bottom wall 4, top wall 5 and end wall 6, the remaining end being open to permit the entry of the lipstick. Secured in the casing 1, or integral therewith, is a partition 7 which divides the interior of the casing into a relatively wide lipstick chamber 8 and a relatively narrow mirror chamber 9. The top wall 5 overlies and closes the top of the lipstick chamber 8 and terminates adjacent the partition 7, thereby leaving the chamber 9 open at the top.

A lipstick holder 20 is provided for carrying a lipstick and for closing the end of the casing 1. The holder 20 preferably comprises a cap 21 having walls corresponding to the front, rear, top and bottom walls of the casing and adapted to lie in alignment therewith when the cap 21 is in position closing the casing. The cap 21 may have a closed end wall 22 adapted to form the second end wall of the holder.

A lipstick sheath 23 which preferably is of tubular form and corresponding to the shape of the casing, extends from and is secured to the cap 21. Slidable in the sheath 23 is a socket 24 adapted to receive the end of a lipstick pencil 25 or other stick of cosmetic material. A shank 26 extends from the socket 24 and through an elongated slot 27 in the top wall of the sheath 23 and terminates in an enlarged knob 28. The cap 21 preferably is provided with a notch 29 to receive the shank 26 when the knob is in the position shown in Fig. 1. The knob serves as means for sliding the socket 24 in the sheath 23 for the purpose of exposing the end of the lipstick 25.

A mirror assembly 30 is slidably mounted in and guided for movement into and out of the mirror chamber 9. The mirror assembly 30 preferably includes a mirror frame 31 carrying a mirror 32 which may be formed of glass or polished metal or other suitable reflecting material. Preferably the frame 31 is formed with side flanges 33 and end flanges 34 which define a seat for the mirror 32, and the top edges of the flanges 33 preferably extend beyond the face of the mirror 32. The mirror 32 is secured in the frame 31 in a suitable manner, as by means of an adhesive or bent over lugs 35 or both.

The top wall 5 of the casing 1 may be formed with one or more openings 50 for the purpose of permitting assembly or adjusting operations. The flange 33 of the mirror frame 31 may be formed with suitable extensions 51 adapted to enter the openings 50 for closing the latter and providing a substantially continuous top wall when the mirror is concealed in the casing 1.

The mirror frame 31 carries a plurality of rearwardly projecting lugs or pins 36, 37 adapted to cooperate with the sheath 23 to raise and lower the mirror assembly 30. The pins 36 and 37 are adapted to extend through elongated slots 38 and 39 formed in the partition 7 and having lateral extensions 40 and 41 respectively at their upper ends. The pins 36 and 37 project through the slots 38 and 39 and are adapted to engage in slots 48 and 49 formed in the adjacent side wall of the sheath 23. The slots 48 and 49 are angularly inclined upwardly and forwardly and each communicates at its upper end with a longitudinally extending slot 46 adjacent the upper end of the front wall of the sheath 23.

When the holder 20 is inserted in the casing 1 and the members are in the position shown in Fig. 4 wherein the cap 21 closes the open end of casing 1, the pins 36 and 37 are at the lower ends of the slots 38 and 39 and the slots 48 and 49. In this position the mirror assembly 30 is retracted into and entirely enclosed in the chamber 9, and the top flange of the frame 31 is substantially flush to the top wall 5 of the casing 1. As seen in Figs. 1 and 4, the cap 21 abuts the end edges of the casing 1 and a substantially closed housing is formed.

Spring means, such as a leaf spring 52, may be provided adjacent the inner end of the mirror assembly 30, as shown in Fig. 5. The spring 52 serves to urge the mirror to the left (as seen in Fig. 5) and force the pins 36 and 37 against the edges of the corresponding slots thereby to prevent the mirror assembly 30 from rattling. Also the spring 52 serves to maintain the mirror assembly 30 in exposed position, as more fully described hereinafter.

A projection 53 may be provided on the lower edge of the slot 46 adjacent the upper end of the inclined slot 49. This projection 53 serves to exert a positive force on the pin 37 for moving the mirror assembly 30 to its final exposed position as explained more fully hereinafter.

When the holder 20 is separated from the casing 1, the edges of the slots 48 and 49 exert an upward thrust on the pins 36 and 37 to move them in a vertical direction, the pins 36 and 37 being confined to this vertical movement by the slots 38 and 39. Upon continued separating movement of the holder 20 and the casing 1, the pins pass out of the slots 48 and 49 and into the longitudinal slot 46, the pin 36 promptly being disengaged from the sheath 23.

The projection 53 engages the pin 37 and urges the mirror assembly 30 in a horizontal direction to force the pins 36 and 37 into the lateral extensions 40 and 41 of the slots 38 and 39. Further movement of the holder 20 has no further effect on the mirror assembly 30 and the holder 20 can be entirely disengaged from the casing 1 for the purpose of using the lipstick. The lipstick can be ejected from the sheath 23 by a suitable movement of the knob 28, in the usual manner.

It will be seen that as the pins 36 and 37 are forced upwardly by the cam action of the slots 38, 39, 48 and 49, the mirror assembly 30 is elevated and projected out of the casing 1 to expose the greater portion of the face of the mirror 32. When the pins 36 and 37 enter the lateral extensions 40 and 41, they rest upon the bottom edges of the extensions and serve to support the mirror in exposed position. The spring 52 bears against the adjacent edge of the mirror frame 31 and forces the pins 36 and 37 against the ends of the lateral extensions 40 and 41 thus retaining the mirror in exposed position.

The casing 1 is closed by inserting the end of the sheath 23 in the open end of the casing 1 and urging the sheath 23 into the casting until the edges of the cap 21 abut the corresponding edges of the casing 1. During the inserting movement of the sheath 23 the pin 37 rides along in the slot 48 until it strikes the projection 53. This urges the mirror assembly 30 horizontally against the force of the spring 52 and thereafter the pins 36 and 37 strike the edges of the slots 48 and 49 and ride into the slots 48 and 49. The mirror assembly 30 is then depressed by the cam action of the slots in the sheath 23 and the partition 7 and enters the chamber 9. Preferably, the pin 37 is mounted at a higher level than the pin 36 so that the pins strike the entrance edges of the slots 49 and 48 respectively at the same time and both ends of the mirror frame are depressed simultaneously.

The actuating mechanism for the mirror assembly may take various forms and one modified form is shown in Fig. 7. A casing 101 generally similar to the casing 1 is provided and is formed with a partition 102 dividing the casing into a lipstick chamber (not shown) and a mirror chamber 103. A holder 104 is provided and is generally similar to the holder 20. However, the holder 104 carries a rack 105 adapted to engage a pinion 106 carried on a pin 107 for rotation on the partition 102. The pinion 107 meshes with a second pinion 108 carried on a pin 109 and the second pinion 108 meshes with a rack 110 carried on a mirror frame 111. The mirror frame 111 carries a mirror 112 and is slidably mounted for movement into and out of the mirror chamber 103.

Upon separating movement of the holder 104 and casing 101, the rack 105 drives pinions 106 and 108 to actuate the rack 110 and elevate the mirror 112 into exposed position. Upon a reverse movement of the holder 104 and casing 102, the rack 105 drives the pinions 106 and 108 and the rack 110 to lower the mirror 112 into concealed position within the chamber 103.

From the foregoing it will be seen that the present invention provides a lipstick device having a mirror associated therewith, wherein the mirror is automatically moved to exposed position in a positive manner by the separation of the lipstick holder from the casing and is automatically returned to concealed position within the casing by positively acting mechanism when the holder is returned to a position closing the casing. When the mirror is in exposed position it is positively and effectively maintained in this position for use.

The mirror is returned to concealed position within the casing simply by the operation of assembling the holder with the casing and no additional manual operation, either preliminary to returning the holder or simultaneously therewith, is necessary. When the mirror is in concealed position it is fully and completely protected against dirt and damage and consumes a minimum of space within the casing. The several portions of the device are so formed that when assembled in closed position they are flush and constitute a neat and attractive article having no unattractive projections. Also there is no mechanism exposed which is likely to be damaged or accidentally actuated to cause the device to open or expose the mirror.

The mirror extends over an area substantially equal to the largest cross-sectional area of the casing and, when the mirror is in the position of use, substantially all the surface of the mirror is exposed to the view. Thus, the construction provides a reflecting surface of relatively large size without requiring substantial increasing of the size of the casing or holder.

The device is relatively simple and can be easily and economically manufactured in large quantities. The principal portions of the device can be manufactured by quantity operations such as punching, stamping, die-casting or like operations and the several members can be quickly and easily assembled.

While certain novel features of the invention have been disclosed and are pointed out in the annexed claims, it will be understood that various omissions, substitutions and changes may be made by those skilled in the art without departing from the spirit of the invention.

I claim as my invention:

1. A lipstick device including a casing having an open end and adapted to telescopingly receive a lipstick, a separable cap adapted to carry a lipstick and to close the end of said casing, a mirror, means mounting said mirror for sliding movement into and out of said casing, and means actuated by the separating movement of said cap for urging said mirror out of said casing in a direction transversely to the movement of the cap.

2. A lipstick device including a casing having an open end and a partition dividing the casing into a plurality of chambers, a separable cap adapted to carry a lipstick and close the end of said casing when said lipstick is inserted in one of said chambers, a mirror, means mounting said mirror for sliding movement into and out of another of said chambers, and means actuated by the separating movement of said cap for urging said mirror out of said chamber.

3. A lipstick device including a casing having an open end and adapted to telescopingly receive a lipstick, a separable cap adapted to carry a lipstick and close the end of the casing, a mirror, means mounting said mirror for movement into and out of said casing, and cam means connected between said mirror and said cap for urging said mirror out of said casing when said cap is moved away from a position closing said casing.

4. A lipstick device including, a casing having an open end adapted to receive a lipstick, a holder adapted to carry a lipstick, a partition in said casing, a mirror movable into and out of said casing, a frame carrying said mirror, means on said frame adapted to extend through said partition for engagement with said holder, and means on said holder engageable with said projection for moving said mirror into and out of said casing upon movement of said holder out of said casing.

5. A lipstick device including, a casing adapted to receive a lipstick, a separable cap adapted to carry a lipstick and to close said casing, a mirror, means mounting said mirror for movement into and out of said casing and a geared connection between said cap and said mounting means for moving said mirror out of said casing upon separation of said cap and said casing.

6. A lipstick device including, a casing adapted to receive a lipstick, a holder adapted to carry a lipstick and having a cam surface to close a cap attached to said holder and adapted to close said casing, a mirror, a frame carrying said mirror and slidable into and out of said casing, a projection on said mirror frame adapted to engage the cam surface of said holder and constituting therewith means for projecting said mirror from said casing upon separation of said holder and said casing.

7. A lipstick device including, a casing, a cap adapted to carry a lipstick and to close said casing, a mirror, means mounting said mirror for movement into and out of said casing, means actuated by the separation of said cap and said casing for moving said mirror out of said casing into exposed position, and means for rigidly supporting said mirror in exposed position.

8. A lipstick device including, a casing, a cap adapted to carry a lipstick and to close said casing, a mirror, means mounting said mirror for movement into and out of said casing, means actuated by the separation of said cap and said casing for moving said mirror upwardly out of said casing, and then laterally, into exposed position, and means for rigidly supporting said mirror in exposed position.

9. A lipstick device including, a casing, a cap adapted to carry a lipstick and to close said casing, a mirror, means mounting said mirror for movement into and out of said casing, means actuated by the separation of said cap and said casing for moving said mirror between its position within said casing and its position projecting from said casing, and means resiliently cushioning said mirror in said casing.

10. A lipstick device including a casing, a cap adapted to carry a lipstick and to close said casing, a mirror, means mounting said mirror for movement into and out of said casing, means actuated by the separation of said cap and said casing for moving said mirror between its position within said casing and its position projecting from said casing, means for positively supporting said mirror in exposed position, and means resiliently cushioning said mirror in said casing, and serving also to retain said mirror resiliently in positively supported exposed position.

11. A lipstick device including a casing, a holder adapted to carry a lipstick, a mirror, means including a mirror frame mounting said mirror for movement into and out of said casing, means on said mirror frame engageable with said holder for actuating said mirror upon relative movement between said holder and said casing, and means for simultaneously actuating said spaced means upon predetermined relative movement of said holder and said casing.

12. A lipstick device including a casing, a holder adapted to carry a lipstick, a mirror, means including a mirror frame mounting said mirror for movement into and out of said casing, projections on said mirror frame engageable with said holder for actuating said mirror upon relative movement between said holder and said casing, spaced, inclined slots in said holder engageable with said spaced projections, and means for simultaneously engaging said spaced projections with said slots upon predetermined relative movement of said holder and said casing for simultaneously actuating said projections to move said mirror.

JOSEPH KEITH O'MOORE FARRELL.